(12) United States Patent
Tirella et al.

(10) Patent No.: US 12,081,091 B2
(45) Date of Patent: Sep. 3, 2024

(54) SYSTEM FOR GENERATING A LINEAR MOVEMENT

(71) Applicant: GENERGO S.R.L., Como (IT)

(72) Inventors: Vincenzo Tirella, Coldrerio (CH); Simone Brunetti, Rome (IT)

(73) Assignee: GENERGO S.R.L., Como (IT)

( * ) Notice: Subject to any disclaimer, the term of this patent is extended or adjusted under 35 U.S.C. 154(b) by 333 days.

(21) Appl. No.: 17/601,335

(22) PCT Filed: Apr. 5, 2019

(86) PCT No.: PCT/IB2019/052799
§ 371 (c)(1),
(2) Date: Oct. 4, 2021

(87) PCT Pub. No.: WO2020/201817
PCT Pub. Date: Aug. 10, 2020

(65) Prior Publication Data
US 2022/0173645 A1 Jun. 2, 2022

(51) Int. Cl.
*H02K 33/16* (2006.01)
(52) U.S. Cl.
CPC .................... *H02K 33/16* (2013.01)
(58) Field of Classification Search
CPC ....... H02K 33/16; H02P 25/06; H02P 25/062; H02P 25/064; H02P 25/066
See application file for complete search history.

(56) References Cited

U.S. PATENT DOCUMENTS

| | | | |
|---|---|---|---|
| 8,013,480 B2* | 9/2011 | Bang | B06B 1/045 310/12.33 |
| 10,639,673 B2* | 5/2020 | Lee | B06B 1/0261 |
| 2008/0001484 A1 | 1/2008 | Fuller et al. | |
| 2014/0062225 A1* | 3/2014 | Kim | H02K 33/00 310/15 |
| 2014/0265650 A1* | 9/2014 | Jeon | H02K 33/16 310/25 |
| 2018/0190085 A1* | 7/2018 | Khoshkava | B06B 1/045 |
| 2018/0248458 A1 | 8/2018 | Amemiya | |

FOREIGN PATENT DOCUMENTS

| | | |
|---|---|---|
| EP | 3343738 A1 | 7/2018 |
| JP | S55119978 A | 9/1980 |
| JP | 2013104967 A | 5/2013 |

OTHER PUBLICATIONS

International Search Report & Written Opinion received for the PCT Application No. PCT/IB2019/052799, mailed on Dec. 12, 2019, 14 pages.
Notice of Reason for Refusal of JP Application No. 2021-560411—Apr. 5, 2019—Genergo S. R. Elle.

* cited by examiner

*Primary Examiner* — Jeremy A Luks
(74) *Attorney, Agent, or Firm* — Amster, Rothstein & Ebenstein LLP

(57) ABSTRACT

A system for generating a linear movement including an electromagnetically charged body which is free to move along a main direction, a static field generator, and two buffer elements. The movement of the electromagnetically charged body along the main direction is controlled by the static field generator and by the buffer elements. The static field generator is alternately powered with a power profile such as to generate the displacement of the system in one of the two ways along said main direction.

17 Claims, 8 Drawing Sheets

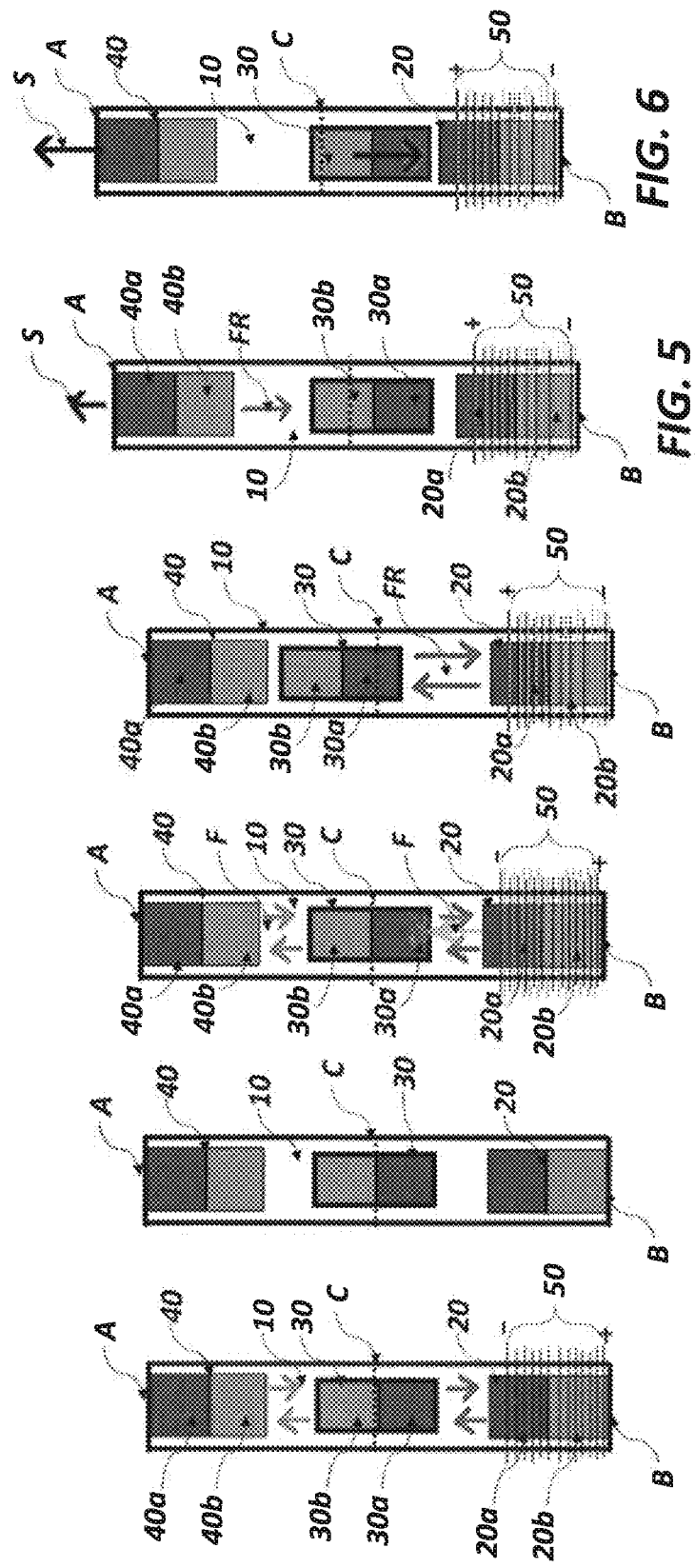

SYSTEM FOR GENERATING A LINEAR MOVEMENT

CROSS REFERENCE TO RELATED APPLICATIONS

This application claims benefit under 35 U.S.C. § 371 to international application No. PCT/IB2019/052799 filed on Apr. 5, 2019, the content of which is incorporated by reference in its entirety.

FIELD OF THE INVENTION

The present invention generally relates to a linear motor. In particular, the present invention relates to a motor which utilizes an electromagnetically charged body to move a system which comprises it along a main direction.

BACKGROUND ART

Current motors are based on two general principles to generate motion and may be divided into two macro categories of movement: friction motors and variable-mass motors.

Friction motor means any motor which, regardless of the power method used, generates a movement which is mechanically transferred to an external object or surface and, by means of this movement, generates a friction between the object to which the motor is coupled and the external object or surface.

For example, a motor of a car transmits the movement generated by the motor to the wheels of the car, thus generating the movement of the car on the road as a result of the friction with the road surface. Indeed, the car moves by means of this friction generated between the wheels and the asphalt. Similar examples could be the wheels of trains with the rails or even the magnetic levitation system of trains or the sails of a sailing ship.

The second macro-category relates to variable-mass motors, i.e. motors which "launch a mass" in the direction opposite to the movement that they must perform and are based on the action/reaction principle. Emblematic examples of this type of motors are rockets which emit a stream of particles in the direction opposite to the movement they are intended to perform.

SUMMARY OF THE INVENTION

The motor suggested herein is not based on either of the two macro principles outlined above.

Indeed, the linear motor described herein does not emit mass and does not use friction to move but generates a force which pushes it in the desired direction.

Furthermore, unlike friction motors, the self-propulsion motor has no achievable speed limit as it generates a constant acceleration, and therefore in the absence of friction (e.g., in space), it can ideally achieve any speed.

BRIEF DESCRIPTION OF THE DRAWINGS

Further features and advantages of the invention will become apparent from the reading of the following description provided by way of non-limiting example, with the aid of the figures shown on the accompanying drawings, in which:

FIG. 1 shows an example of system according to the present invention,

Figures from 2 to 6 show the system in successive steps which lead to the movement of the system, Figures from 7 to 18 show different embodiments of the system according to the present invention.

Figure 8:
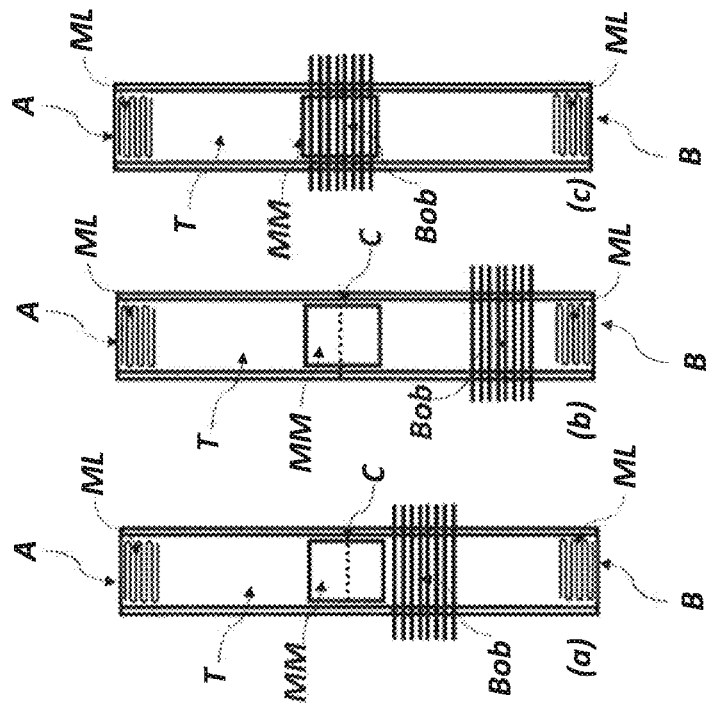

The parts according to the present description are shown in the drawings, where appropriate, with conventional symbols, showing only those specific details which are pertinent to understanding the embodiments of the present invention, so as not to highlight details which will be immediately apparent to those skilled in the art with reference to the description given herein.

DETAILED DESCRIPTION OF THE INVENTION

With reference to FIG. 1, the motor or moving system according to the present invention generally consists of an electromagnetically charged body which moves within a delimited volume of space being electromagnetically accelerated and decelerated in a controlled manner during its movement within the aforesaid volume of space.

Such accelerations/decelerations generate a force on the volume in which the mass moves and allow the volume of space to move.

An example of a first embodiment is depicted in FIG. 1.

In FIG. 1, the basic elements of the solution suggested herein can be identified, i.e. a tube 10, e.g. a hollow cylinder, which contains three magnets 20, 30 and 40 therein, one of which (30) is movable and two (20 and 40) are fixed, and an electromagnet or coil 50. The two fixed magnets 20 and 40 are fixed inside the tube 10 at the two opposite ends A and B thereof. The third movable magnet 30 is arranged in the central portion C of the tube 10. The coil 50 is anchored to the tube 10 on the outer portion thereof. In the disclosed example, the coil 50 is wound around and surrounds the tube 10 from the end portion B and extends over about one quarter of the length of the tube 10. In particular, the coil 50 is positioned on the outside of the tube and surrounds the portion of tube 10 which contains the fixed magnet 20. The three magnets 20,30,40 are arranged so as to show opposite poles facing each other. In particular, in the condition of equilibrium shown in FIG. 1, it results that the first fixed magnet 20 is positioned so that the positive pole 20b thereof faces the outside of the tube 10, i.e. towards the end portion B of the tube 10, and the positive pole 20a thereof faces the central portion C of the tube 10. The second movable magnet 30 is positioned inside the tube 10 in the central portion C so that the negative pole 30a thereof faces the negative pole 20a of the first fixed magnet 20. Finally, the third magnet 40 is positioned so that the positive pole 40b thereof faces the inside of the tube 10, i.e. towards the central portion C of the tube 10, and the negative pole 40a thereof faces the outside of the tube 10, i.e. towards the end portion A of the tube 10. The third fixed magnet 40 is thus positioned inside the tube 10 so that the positive pole 40b thereof faces the positive pole 30b of the second movable magnet 30.

FIG. 1 shows the condition of equilibrium. In particular, the two fixed magnets 20,40 hold the movable magnet 30 in place by virtue of the repulsive forces of the poles of the same sign facing one another. Therefore, the repulsive forces between the poles of the same sign mutually repel the magnets. In particular, the two negative poles 20a and 30a repel each other and the positive poles 30b and 40b repel each other. Therefore, the movable magnet 30 remains stationary in the central portion C of the tube 10 because the two repulsive forces which are generated with respect to two fixed magnets 20,40 are balanced. In the example in FIG. 1, the coil 50 is not powered and therefore the system is in the condition of equilibrium in which the movable magnet 30 is stationary in the center of the tube 10 in the central portion C. Naturally, the description provided hereto also applies in the dual case in which the magnets take reversed positions with respect to the poles. Therefore, the fixed magnet 20 has the positive pole 20a facing the outside of the tube 10 (end portion B) and the negative pole 20b facing the central portion C of the tube 10, the movable magnet 30 has the positive pole 30b thereof facing the end portion B and the negative pole 30a thereof facing the end portion A, and the fixed magnet 40 has the negative pole 40a thereof facing the central portion C of the tube 10 and the positive pole 40b thereof facing the end portion A. Again, in this case, the repulsive forces between the poles of the same sign mutually repel the magnets.

The system operation will now be described step-by-step with reference to FIGS. 2-5.

FIG. 2 shows the initial condition of equilibrium. As mentioned above, in this condition, the movable magnet 30 is stationary in the condition of equilibrium thereof in the central portion C of the tube 10. Such a movable magnet 30 is held stationary by the repulsive forces which are generated between the poles of the same sign by virtue of the orientation of the two fixed magnets 20 and 40.

Therefore, at time t0 there is a situation of equilibrium.

With reference to FIG. 3, the coil 50 is added, being wound on the end portion B of the tube 10. In particular, the coil 50 is wound on the end portion of the tube 10 at the fixed magnet 20. Initially, such a coil 50 is not powered and in FIG. 3 the situation of equilibrium, also shown in FIG. 2, remains. In other words, the movable magnet 30 is held in equilibrium in central position by the repulsive forces F generated by the two fixed magnets 20 and 40.

At time t1, there is the activation of a coil which generates an electromagnetic field.

In FIG. 4, the coil 50 is powered, e.g. by a square-wave pulse or a sinusoid or a sawtooth waveform, and the movable magnet 30 moves due to the increased magnetic field generated by the coil 50 in the direction towards the end A of the tube 10. In particular, the movable magnet 30 approaches the fixed magnet 40 pushed by the repulsive force FR which is created between the poles 20a and 30a of the same sign of the two magnets 20 and 30. Therefore, the movable magnet 30 moves towards the fixed magnet 40 (in the direction towards end A) as long as the repulsive force generated by the approaching of the two poles 30b and 40b of the same sign stops the movable magnet 30.

Then, at time t2, the movable magnet 30 interacts with the electromagnetic field generated by the coil 50 and moves from the position of equilibrium to get closer to the fixed magnet 40 (an embodiment is shown in the example, but the dual embodiment with the inversion of the power supplied to the coil 50 may also be considered).

More in detail, by energizing the coil 50, an increase of the magnetic field is generated, which increases the repulsive force between the movable magnet 30 and the fixed magnet 20, and which moves the movable magnet 30 in the direction approaching the fixed magnet 40. The movable magnet 30 acquires a kinetic energy which is transferred to the entire system in the instant of maximum approach before inverting the motion of the movable magnet 30.

At time t3, see FIG. 5, the coil 50 is either switched off or the polarity thereof is reversed or the intensity thereof is lowered, and the central magnet 30, being in a position other than its normal position of equilibrium, receives a force which tends to take it back to a situation of equilibrium, and the complete system (tube 10, magnets 20,30,40 and coil 50) receives an equal and opposite force in the opposite direction.

With reference to FIG. 6, at time t4, the movable magnet 30 being accelerated would basically tend to move beyond its normal position of equilibrium and further approach in the direction of the fixed magnet 20, which would repel it again beyond the position of equilibrium, and if left in this situation, a series of increasingly smaller oscillations of the movable magnet 30 would occur until it reaches the position of equilibrium again.

Instead, the coil 50 is reactivated in a precise moment so as to decelerate the movable magnet 30 and repel it in the situation at time t2, see FIG. 4.

At time t5, steps from t2 to t5 are repeated so as to hold the system in motion.

In particular, the displacement of the system consisting of tube 10, magnets 20,30,40 and coil 50 occurs in the direction indicated by arrows S in FIGS. 5 and 6.

The advancement occurs due to the mechanical thrust of the movable magnet 30 on the fixed magnet 40. In particular, in order to prevent the magnets from getting worn, the impact between them is avoided and the repulsion moves the two magnets away when they are taken too close.

In brief, the system generates a series of linear movements by providing a series of pulses (square-wave, sinusoid, sawtooth wave) with a given frequency as a power for coil 50, i.e., an impulsive power with a peak which then descends. In particular, by supplying current to the coil 50, a linear movement of the system is obtained due to the repulsive forces between the poles with the same charge of magnets included in the system. Such a linear movement is also achieved in vacuum and therefore the movement is not due to vibrational effects or friction.

Therefore, the solution described herein allows obtaining a linear movement by energizing the coil 50 by means of a generator (e.g. a battery). The movement obtained depends on the pulses of the waveform by which the coil 50 is powered.

The powering of the coil 50 allows obtaining an unbalanced thrust in a given direction with respect to the main axis so as to move the entire system in a direction. Therefore, different responses of the system can be obtained by choosing different pulse amplitude and frequency for powering the coil 50.

The powering of the system is alternating and not direct so as to generate the movement of the motor and can be adjusted in various ranges of frequencies and with various waveforms (by way of example, square-wave, sawtooth, sinusoidal, etc.) so as to generate various types of thrust along the two axes and various types of accelerations of the system.

Some possible embodiments of the system described herein will now be described.

Figure 7:
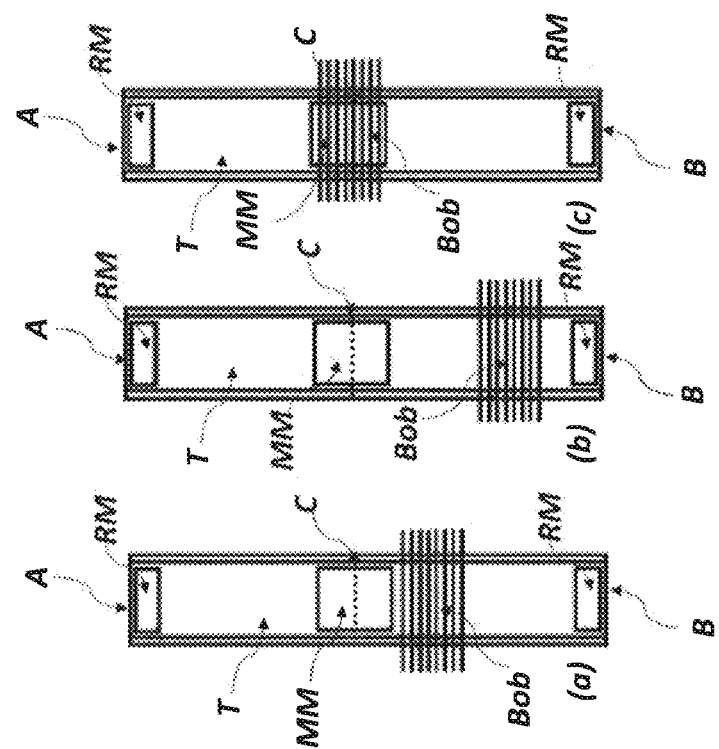

The simplest diagram of the system is shown in FIG. 7. In particular, in this case, there is a movable magnet MM inserted in a tube T, e.g. a hollow cylinder, closed at the ends A and B thereof and provided with two mechanical bumpers RM at the ends of the tube T, and a single coil Bob.

The coil Bob may take different positions on the tube T. In particular, in FIG. 7a), the coil Bob is in the first portion of the tube T just below the central portion C of the tube T and below the movable magnet MM. Otherwise, in FIG. 7b), the coil Bob is again located in the first portion of the tube T below the movable magnet MM and close to the end B of the tube T. Finally, in FIG. 7c), the coil Bob is located in the central portion C of the tube T and surrounds the tube T when the movable magnet MM is in the rest position.

During the operation of the system in the three cases a), b) and c), according to the position of the coil, only the motor efficiency and the related frequency range simply change, because the principle is substantially the same.

The two mechanical bumpers RM can be made of an elastic material, such as silicone rubber, for example (see FIG. 7).

The tube T, as already mentioned, may be a hollow cylinder with circular section or a tube with a square, rectangular, oval, hexagonal or other type of section, for example.

In one or more alternative embodiments, the two mechanical bumpers RM can be made in the form of two elastic elements or springs ML (see FIG. 8) positioned in the two end portions A and B of the tube T. Again, in this case, the coil Bob may take different positions as shown in the embodiments a), b) and c) in FIG. 8. The coil Bob can take the same positions as described for FIG. 7, namely:

- in the first portion of the tube T just below the central portion C of the tube T and below the movable magnet MM;
- in the first portion of the tube T below the movable magnet MM and close to the end B of the tube T; or
- in the central portion C of the tube T and surrounds the tube T when the movable magnet MM is in the rest position.

Figure 9:
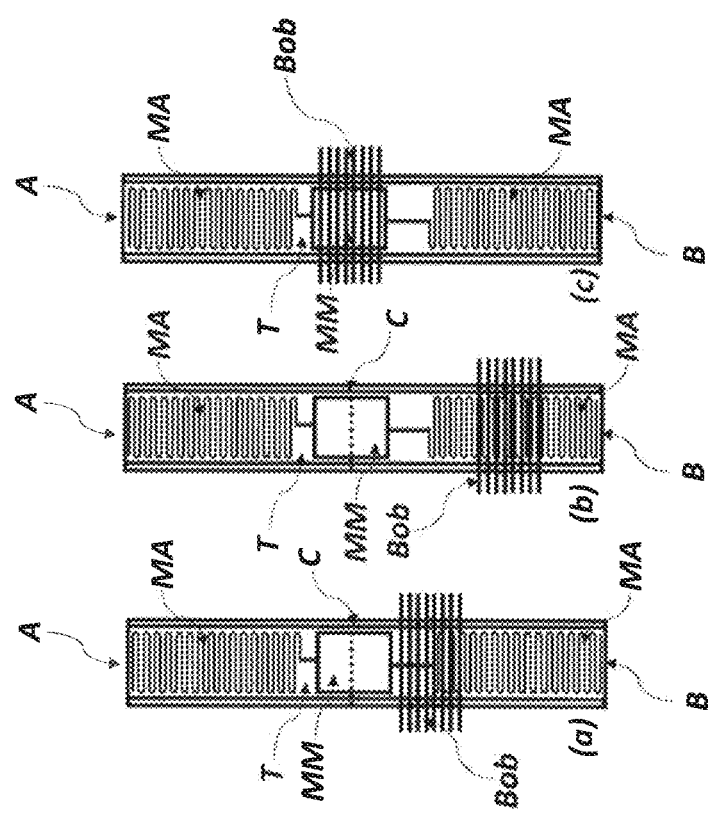

Alternatively, as shown in FIG. 9, the movable magnet MM can be held in a position of equilibrium by a system of springs Ma. In particular, springs Ma are anchored to the end portions A and B of the tube T. Again, in this case, the coil Bob may take different positions, as shown in embodiments a), b) and c) in FIG. 7 and FIG. 8.

Figure 10:
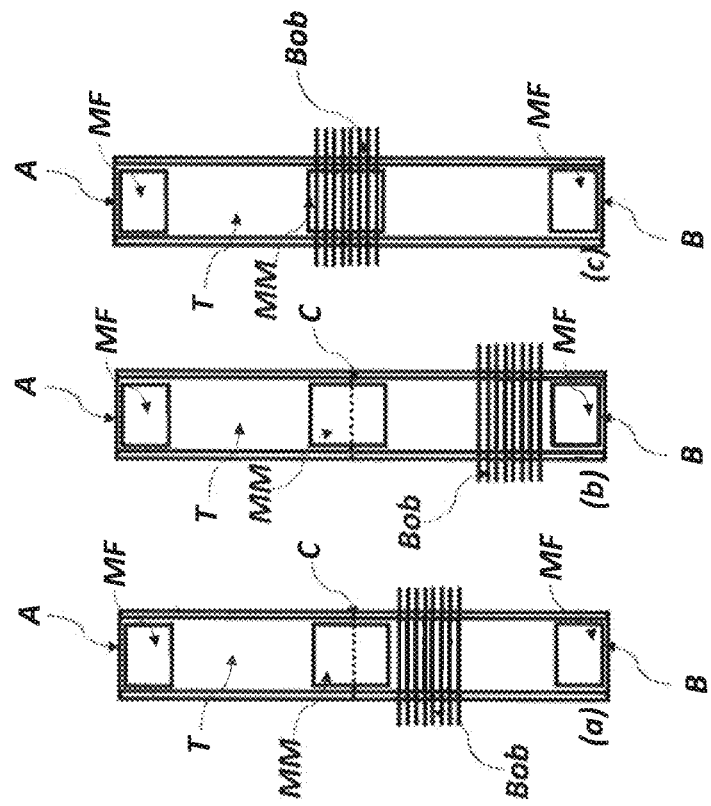

Other possible embodiments are shown in FIG. 10. In particular, in this case, the system comprises a tube T closed at ends A and B with a movable magnet MM therein in the central portion C and two fixed magnets MF blocked at the ends A and B of the tube T. Again, in this case, there is a single coil Bob wound on the tube T in the three possible positions:

- in the first portion of the tube T just below the central portion C of the tube T and below the movable magnet MM;
- in the first portion of the tube T below the movable magnet MM and close to the end B of the tube T; or
- in the central portion C of the tube T and surrounds the tube T when the movable magnet MM is in the rest position.

In the embodiments in FIG. 10, the magnets can also have mutually different dimensions.

Figures 11, 12:
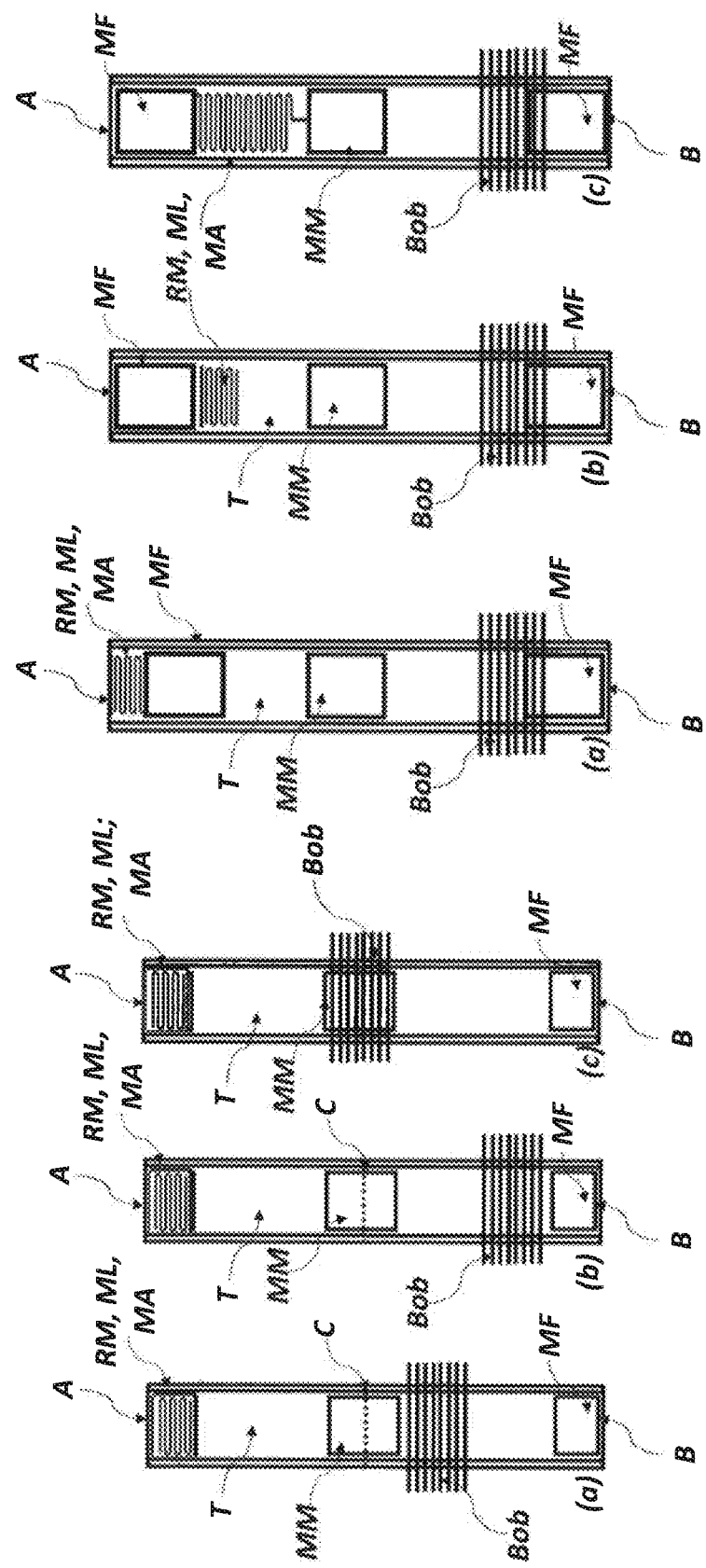

Further embodiments (see FIGS. 11 and 12) can be obtained by mixing the features of the solutions in FIG. 10 with one of the three variants (a,b,c) in FIG. 7, FIG. 8 or FIG. 9. In particular, there may be a mechanical buffer RM made of elastic rubber at the first end A, a buffer spring ML or a spring MA coupled between the tube T and the movable magnet MM and a fixed magnet MF at the other end B of the tube T. Alternatively, the elements may be mutually reversed at the two ends A and B of the tube T.

Further embodiments (see FIGS. 11 and 12) can be obtained by mixing the features of the solutions in FIG. 10 with one of the three variants (a,b,c) in FIG. 7, FIG. 8 or FIG. 9, In particular, there may be a closed tube T with a movable magnet MM therein in the central portion C and two fixed magnets MF fixed at the ends A and B of the tube T. The magnets can also have mutually different dimensions. Again, in this case, there is a single coil Bob. In these alternative embodiments, there may be a mechanical buffer RM, which may be made of an elastic material, such as silicone rubber, between the end A of the tube T and the fixed magnet MF. In a variant, there may be one or two springs ML or a system of springs MA which hold the fixed magnet MF in a position of equilibrium. Naturally, the pair consisting of fixed magnet MF and mechanical buffer RM may only be from end A or from both ends A and B.

According to a further variant, there may be two fixed magnets MF secured at the ends A and B of the tube T and two mechanical buffers RM, which may be made of an elastic material, such as silicone rubber, between the fixed magnets MF and the movable magnet MM. In other alternative embodiments, there may be two springs ML or a system of springs MA, which hold the central magnet in a position of equilibrium, or any combination of the preceding elements, between the fixed magnets MF and the movable magnet MM.

Only some of the possible variants which have been described are shown in the figures.

Figures 13, 14:
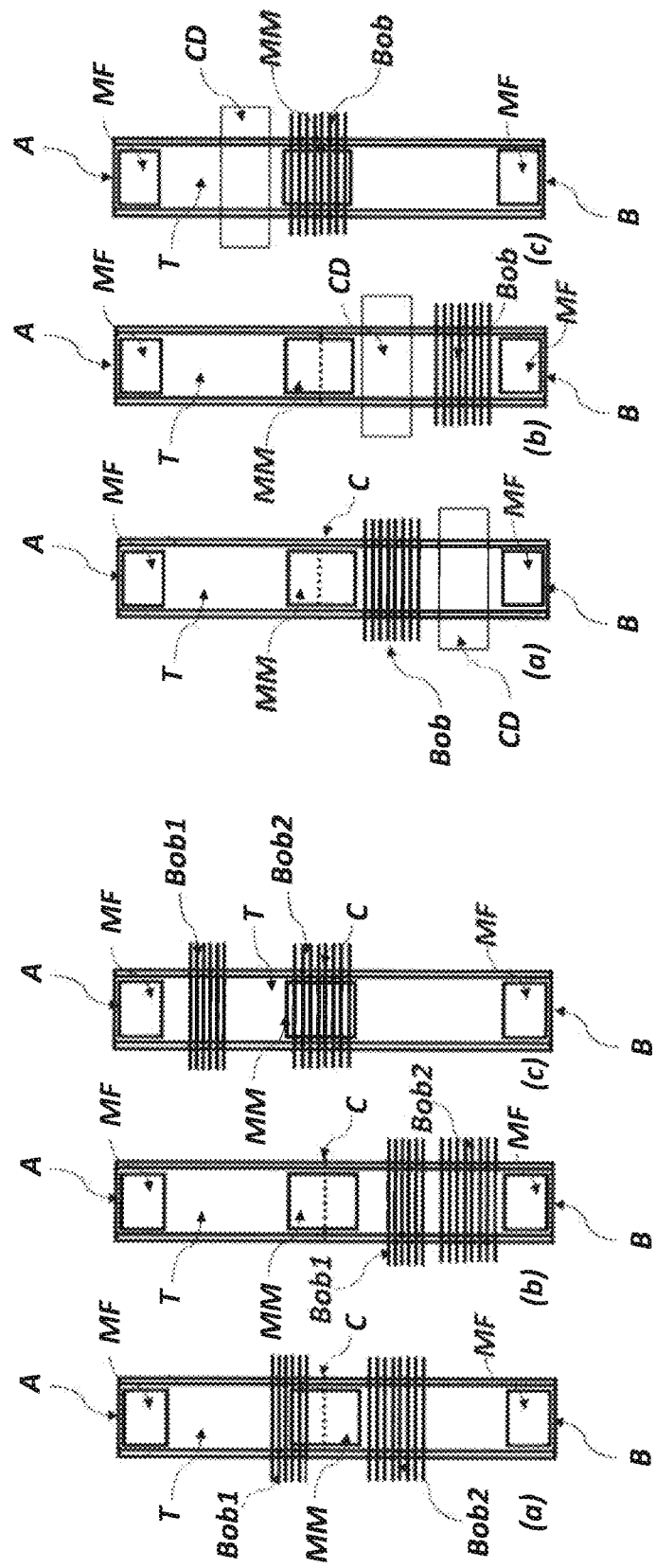

In various other embodiments, see for example FIG. 13, the system comprises a closed tube T with a movable magnet MM in the central portion C thereof, at the two ends A and B thereof, two fixed magnets MF fixed to the ends of the tube T and a pair of coils Bob1 and Bob2. Figures a), b) and c) show three examples of positioning the two coils Bob1 and Bob2. In the disclosed example, the two coils Bob1 and Bob2 have a different number of windings, but embodiments in which the two coils Bob1 and Bob2 are equal may be provided. Alternatively, it is possible to conceive other distributions of the two coils Bob1 and Bob2 along the tube T.

By adjusting the dimension (number of windings and size, supply and frequency of the two coils Bob1 and Bob2), it is possible to adjust the acceleration of the system more efficiently (see FIG. 13). The magnets can also have mutually different dimensions.

Further embodiments are obtained by mixing the features of the solutions in FIG. 13 with one of the three variants (a,b,c) in FIG. 7, FIG. 8 or FIG. 9. In particular, there may be an embodiment with a pair of coils Bob1 and Bob2, at the first end A a mechanical buffer RM made of elastic rubber, a buffer spring ML or a spring MA coupled between the tube T and the fixed magnet MF, then the movable magnet MM, and finally a fixed magnet MF fixed to the other end B of the tube T. Alternatively, the elements may be mutually reversed at the two ends of the tube T.

Further embodiments are obtained by mixing the features of the solutions in FIG. 13 with one of the three variants (a,b,c) in FIG. 7, FIG. 8 or FIG. 9. In particular, there may be an embodiment with a pair of coils Bob1 and Bob2, a closed tube T with a movable magnet MM therein in the central portion C, and two fixed magnets MF fixed at the ends A and B of the tube T. The magnets can also have mutually different dimensions. In these alternative embodiments, there may be two mechanical buffers RM, which may be made of an elastic material, such as silicone rubber, between the ends A and B of the tube T and the fixed magnets MF. In a variant, there may be two springs ML or a system of springs MA which hold the fixed magnets MF in a position of equilibrium.

In all embodiments indicated herein, the system acceleration can be adjusted more efficiently by adjusting the dimension, number of windings and size, the power and the frequency of the two coils Bob1 and Bob2. The magnets can also have mutually different dimensions.

With reference to FIG. 14, a further embodiment can be considered, in which a single coil Bob is present, being wound on a closed tube T with a movable magnet MM therein in a central portion C and two fixed magnets MF fixed at the ends A and B of the tube T. In this alternative embodiment, a diamagnetic cover CD of the tube T is also provided in a position of the tube T between the two fixed magnets MF, with the purpose of acting as a "magnetic brake" to decelerate the movement of the movable magnet MM when returning to the position of equilibrium. The magnets can also have mutually different dimensions.

A variant of the embodiment shown in FIG. 14 includes a pair of coils Bob1 and Bob2 wound on a closed tube T with a movable magnet MM therein in a central portion C and two fixed magnets MF fixed at the ends A and B of the tube T. In this embodiment, a diamagnetic cover CD of the tube T is further provided, being placed in a position of the tube T between the two fixed magnets MF, with the purpose of acting as a "magnetic brake" to decelerate the movement of the movable magnet MM when returning to the position of equilibrium. The magnets can also have mutually different dimensions and the "magnetic brake" CD may be positioned either between the two coils Bob1 and Bob2 or between the coils Bob1 and Bob2 and one end (A or B) of the closed tube T.

More in detail, the diamagnetic cover CD which acts as a magnetic brake is a cover made of a diamagnetic material which is used to brake the movable magnet MM when it moves inside the area of the tube T covered by said diamagnetic cover CD. The diamagnetic cover CD may be made of copper, aluminum, graphite or any strongly diamagnetic material, and may be either passive (i.e., a simple cover not powered) or active, i.e., a copper, graphite or aluminum coil which is activated shortly before the passage of the movable magnet MM. For example, the diamagnetic cover CD may be a hollow cylinder fitted on the tube T.

Alternatively, the braking action can be obtained also in the case of a single coil by reversing the power polarity, or otherwise by including a pair of coils, one for launching or accelerating and one for braking.

A further embodiment of the solution described herein is described with reference to FIG. 15. In particular, in this case, there are a number N of coils Bob1, Bob2, . . . , BobN, wound on a closed tube T with a movable magnet MM therein in the central portion C and two fixed magnets MF fixed at the ends A and B of the tube T. the system acceleration can be adjusted more efficiently by adjusting the dimension, number of windings and size, the power and frequency of the N coils. The magnets can also have mutually different dimensions.

In detail, it is the purpose of arranging a plurality of N coils to achieve a situation similar to a Gauss rifle in the step of "launching" the movable magnet MM towards one of the two fixed magnets MF and thus to accelerate the movable magnet MM towards a direction and act as a magnetic brake when returning the movable magnet MM in the opposite direction. Therefore, a coil generates a force according to its general shape, according to the position with respect to the movable magnet MM, and as a function of the time when it is activated.

In particular, the Gauss rifle is a barrel which uses magnetic or electromagnetic acceleration to launch metal bullets at very high speed, by virtue of a linear motor placed on a common axis.

Using multiple coils, it is possible to manage the thrust and the accelerations and decelerations of the movable magnet MM controlling them better. It is also preferable to manage each coil individually with a power pack and a frequency adjustable generator of square waves. Therefore, a series of coils as narrow as possible and with large diameter would be preferable, so as to generate powerful magnetic fields. Conversely, an intermediate compromise must be found to avoid making the system too heavy. A good middle ground may be to use two or three offset coils as pulses, so as to avoid making the system too heavy but still manage the accelerations and decelerations with good precision.

Figure 15:
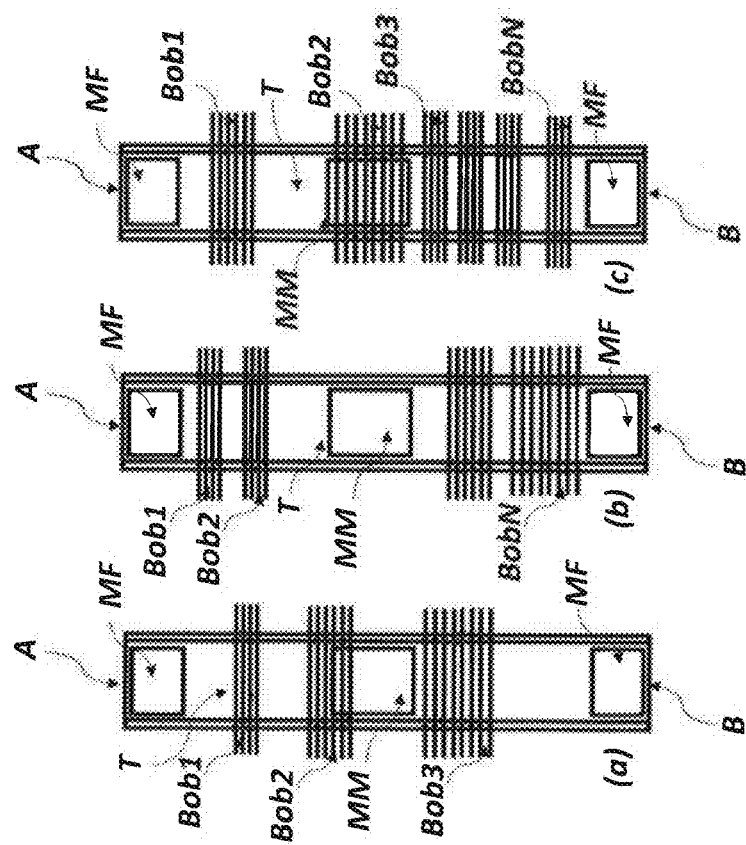

Further embodiments can be obtained from the embodiments shown in FIG. 15 to which one or more diamagnetic covers CD of the tube T are added in various positions of the tube T between the two fixed magnets MF, with the purpose of acting as a "magnetic brake" to decelerate the movement of the movable magnet MM when returning to the position of equilibrium. Again, in this case, the magnets may have mutually different sizes.

Figure 16:
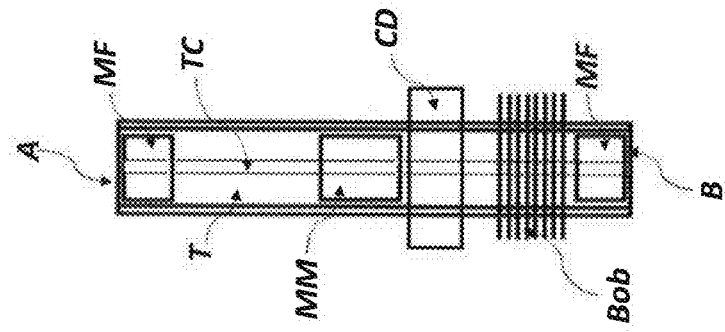

A further variant, which can be applied to all of the embodiments described above, includes the use of a central tube TC made of a diamagnetic material as a further magnetic brake. FIG. 16 shows an exemplary embodiment which includes the use of a central tube TC made of a diamagnetic material as a further magnetic brake.

Figure 17:
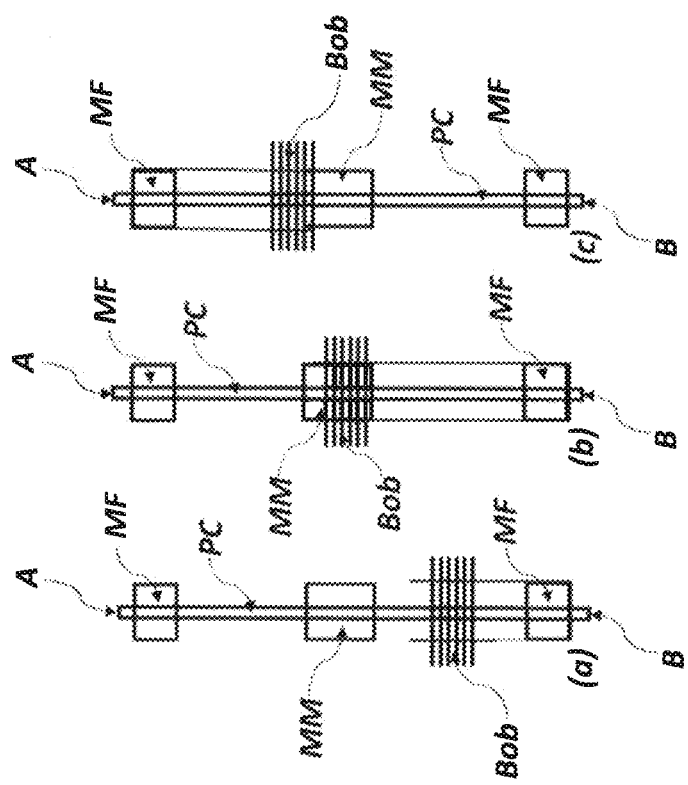

With reference to FIG. 17, a further embodiment of the system according to the invention is described. In this embodiment, a central pin PC is provided, on which a movable magnet MM slides (in this embodiment, pierced in the center) and to which the two fixed magnets MF are fixed at ends A and B.

Naturally, all the variants previously described can also be applied to this embodiment.

In particular, the embodiments are described on the basis of an ever-greater efficiency, the multi-coil system with two fixed magnets is the most efficient, whereas the first system with a single magnet, a single coil and mechanical repulsion means is the least efficient.

Finally, it is possible to achieve a system consisting of multiple systems which can be assembled in order to allow the movement in the vertical direction or in various directions as well.

Substantially, the system described herein behaves as a Gauss rifle in which there are two plugs at the end of the rifle (tube) and the magnet, which replaces the bullet, is repeatedly approached to and/or brought into contact with the buffer elements (springs, magnets, etc.), in particular to/with one of them in a given direction and way, for transferring kinetic energy and putting the entire system into motion.

Naturally, it is possible to conceive moving systems which utilize circular motion, with appropriate transformation means.

An application example will now be described. In the described example, the tube T is made of plastic material which is resistant to impacts and high temperatures. In alternative embodiments, the tube T may also be made of ceramic, sintered ceramics, wood, cardboard, vulcanized fiber or wood or cardboard soaked in epoxy resin.

In particular, the ceramic has the advantage of being highly resistant to high temperatures, mechanically strong, and not being heavy, in addition to not suffering from aging phenomena.

Furthermore, sintered ceramics have the same advantages as traditional ceramics but may have superior features as compared to traditional ceramics.

Wood has a low specific weight and a low thermal transmission which prevents the heat generated by the coils from being transmitted to the central magnet.

Otherwise, carbon has features and advantages similar to wood but a lower specific weight.

Vulcanized fiber has features similar to wood and carbon, but has superior mechanical strength and does not have structural imperfections as it is a homogeneous material as well as an excellent electric insulator.

Wood, carbon or vulcanized fiber soaked in epoxy resin have the same features as the three previous materials but a possibly higher structural strength.

Moreover, in further embodiments, the tube T could also be made of aluminum, graphite or metal, but it appears that strongly diamagnetic or ferromagnetic materials may limit the system performance in some cases.

Therefore, antiferromagnetic materials or materials which do not magnetize are preferable, such as ceramics, plastics, wood and paper.

In the considered embodiments, the tube T has a length which may vary from 0.5 cm to 300 cm and an inner diameter between 0.1 mm and 600 mm. The magnets used (MM AND MF) are preferably selected with a high degree of magnetization and a good thermal resistance due to the eddy currents which could be generated inside the magnet itself during operation.

Figure 18:
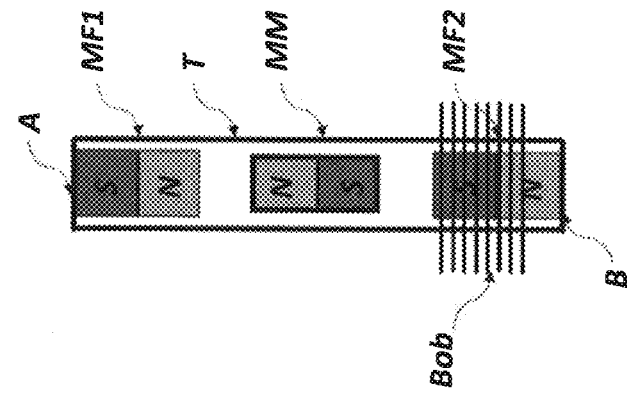

By way of example, see FIG. 18, a plastic tube T of 130 mm in length may be used with an inner diameter of 11 mm and an outer diameter of 15 mm. Two neodymium magnets MF with axial magnetization N52 of 10 mm in diameter and 35 mm in height are fixed by means of epoxy glue at the two ends A and B of the tube T.

The two magnets MF are fixed so that the North Pole (or positive pole) of one of the two magnets MF1 faces the interior of the tube and the South Pole (or negative pole) faces the exterior, whereas the other magnet MF2 is fixed so that the South Pole (or negative pole) faces the interior of the tube T and the North Pole (or positive pole) faces the exterior.

A movable magnet MM, equal to the previous ones MF1 and MF2, which is held in magnetic levitation by the repulsive force generated by the other two magnets MF1 and MF2, is placed inside the tube T between the two magnets MF1 and MF2.

By the way of example, an enameled copper wire coil Bob with a diameter of 0.25 mm may be used wound about the tube T so as to obtain the following overall dimensions: length between 10 and 25 mm, outer diameter 25 mm. The coil Bob is positioned between the movable magnet MM and one of the two fixed magnets MF1 and MF2, in particular in FIG. 18 between MM and MF2. In the described embodiment, the coil Bob is located in this case at about 7 mm from the end portion of the movable magnet MM at rest (in particular, the movable magnet MM is located in the center C of the tube T when it is at rest).

The coil Bob is powered with square-wave pulses with 50% duty cycle at a frequency between 0.5 and 250 Hz, in particular at a frequency of about 5 Hz.

The coils may be driven with square waves at 50% duty cycle generated by a solid-state relay which manages a power pack connected to a high-capacitance capacitor (preferably of the electrolytic type, with two diodes at the output to avoid return effects deriving from the powered coils). In particular, a sawtooth or sinusoidal waveform is also acceptable for driving. Furthermore, waveforms with very narrow and high pulses are preferable.

Finally, it is preferable to use coils made of enameled aluminum as compared to those made of enameled copper given the gain in terms of weight.

Since the percentage of effective magnetic field generated by the coil is maximum if the coil is perpendicular to the magnet, the coils are preferably perpendicular, not inclined.

The system described herein can be used in the aerospace field.

Here is an exemplary embodiment: we will consider a 140 mm methacrylate tube T with inner diameter of 11 mm, wall thickness of 2 mm; at the two ends of the tube T there are two "plugs" glued with a bicomponent epoxy resin which have plastic screws with 0.75 mm pitch and adjustment washers. Another piece of methacrylate is glued at the bottom of the two screws, to which the fixed magnet (neodymium magnet with axial magnetization N50 and dimensions: diameter 10 mm, height 17 mm) is glued using a bicomponent epoxy resin. Therefore, two magnets placed so that the north and the south of the magnets fixed to the ends face each other, are glued to the two ends of the tube T.

A third movable magnet, which is identical to the other two, is placed in the center of the tube and oriented so as to be repelled by the other two which hold it "levitating" in the center of the tube.

Two methacrylate coil-carrying tubes, of 15 mm and 25 mm in length respectively and with a wall thickness of 2 mm, are placed with two screws made of plastic material with a pitch of 0.75 mm and adjustment washers. Washers made of plastic material are glued with cyanoacrylate to the ends of the two tubes which allow the coils to slide in order to hold the wire coils wound; the washers have an outer diameter of 50 mm.

The coils are wound with enameled copper wire for transformers, having a total diameter of 0.25 mm. The coils are wound to achieve an overall outer diameter equal to 25 mm.

This device is powered so that, upon ignition of the coils, the central movable magnet is pushed towards the magnet located behind the coil of greater length (that which is 25 mm long). The two coils are powered in parallel with a voltage of 9 volts and a frequency of 4.37 Hz square-wave with 50% duty cycle. The square waves start from 0 volts to 9 volts. The power supply circuit consists, as a prototype, of an Arduino Nano connected to an IRF540 to generate the square wave and powered by a 9-volt battery. The overall system thus weighs about 90 grams and is able to displace a weight of 200 grams by pushing it in a linear manner on a table.

Naturally, by applying appropriate scale factors it is possible to achieve larger systems with higher returns which can be used in different fields and for various applications.

It can be placed inside a satellite mounted to a plate which is able to move it and orient it at 360° along the horizontal axis and at 360° along the vertical axis so as to move the satellite in all directions.

Given the very low cost of materials, the fact that the coils made of copper however hold the central magnet "levitating", thus preventing it from touching the tube, and the highly low consumptions make it preferable to other types of motors currently used, also not requiring fuel but only electric energy which can also be taken from solar panels, thus allowing any distance in space to be reached. An array of many systems of this type may also be used as a motor for spaceships.

Such a system, being at constant acceleration, allows achieving any speed in space and can be used for space exploration.

System speed can be adjusted by varying the frequencies and power voltages.

It is possible to conceive similar systems which use an electric field instead of a magnetic field for generating the movement by means of electrostatic phenomena.

It is also possible to consider the use of the bifilar coils with double powering in which each wire is fed in a different manner in terms of amperage, voltage and frequency and waveform sent, and in which the two pulses may also be sent with mutually reversed polarity. The use of the bifilar coils instead of single-stranded ones makes the management of the accelerations of the system more precise.

Generalizing further, it is possible to conceive a coil with three or more wires, in which each wire is powered in a different manner in terms of amperage, voltage and frequency and waveform.

Laboratory tests have been conducted with the purpose of measuring the forces developed by the system in hand by means of load cells. Tests were performed on two different prototypes which implement two different embodiments among those described above.

Figure 19:
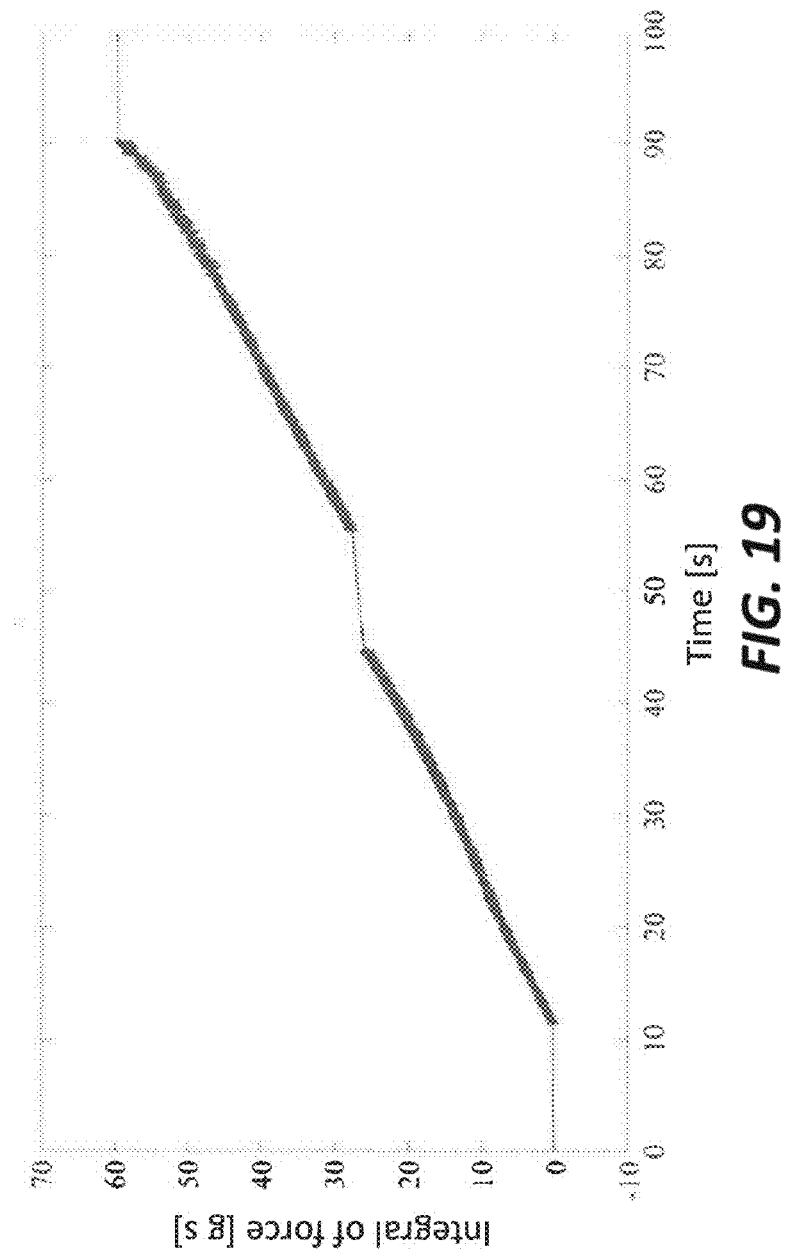
FIG. 19 shows the trend of the integral of the difference of the force measured between two load cells which test the device according to the present invention.

In particular, FIG. 19 shows the time integral of the difference between the readings of the two cells used to measure the reaction of the system to the supplied power. Given the arrangement of the two cells, the difference between their readings provides the sum of the forces detected in the same direction. The difference between the readings is divided by two in order to obtain the mean value of the measured forces from the two cells.

Tests have shown that the tested system generates a greater force in one of two ways along the main direction.

Finally, it is possible to conceive alternative embodiments in which gas or plasma is used as the movable mass inside the system instead of the movable magnet.

Of course, without prejudice to the principle of the invention, the construction details and the embodiments may widely vary with respect to those described and shown by way of mere example, without departing from the scope of the present invention.

The invention claimed is:

1. A system for generating a linear movement, the system comprising an electromagnetically charged body which is free to move along a main direction, at least one static field generator, and at least two buffer elements, wherein a linear movement of said electromagnetically charged body along said main direction is controlled by the at least one static field generator and by the at least two buffer elements; and
   wherein said at least one static field generator is alternately powered with a power profile defined by a series of pulses or periodic waveforms having a predetermined frequency and magnitude so as to generate a series of controlled linear movements of the electromagnetically charged body over a temporal period, wherein a displacement of the electromagnetically charged body occurs during each of the series of controlled linear movements in one of two opposing directions along said main direction, such that an aggregate of incremental displacements of the electromagnetically charged body over the temporal period effects an overall trajectory of the system along the main direction.

2. The system for generating the linear movement according to claim 1, wherein said electromagnetically charged body is a movable magnet which slides inside a hollow tube having opposing closed ends thereof, said at least two buffer elements are mechanical bumpers made of an elastic material and positioned at the opposing closed ends of the hollow tube, and said at least one static field generator is a coil.

3. The system for generating the linear movement according to claim 2 further comprising a central tube extending longitudinally within the hollow tube and made of diamagnetic material which acts as a magnetic brake to decelerate movement of the electromagnetically charged body when returning to a position of equilibrium.

4. The system for generating the linear movement according to claim 1, wherein said electromagnetically charged body is a movable magnet which slides inside a hollow tube having opposing closed ends thereof, said at least two buffer elements are springs positioned at the opposing closed ends of the hollow tube, and said at least one static field generator is a coil.

5. The system for generating the linear movement according to claim 1, wherein said electromagnetically charged body is a movable magnet which slides inside a hollow tube having opposing closed ends thereof, said at least two buffer elements comprise a system of springs positioned at the opposing closed ends of the hollow tube and which hold said movable magnet in a position of equilibrium, and said at least one static field generator is a coil.

6. The system for generating the linear movement according to claim 1, wherein said electromagnetically charged body is a movable magnet which slides inside a hollow tube having opposing closed ends thereof, said at least two buffer elements are two fixed magnets positioned at the opposing closed ends of the hollow tube, wherein said two fixed magnets are positioned so as to hold said movable magnet in a position of equilibrium, and said at least one static field generator is a coil.

7. The system for generating the linear movement according to claim 1, wherein said electromagnetically charged body is a movable magnet which slides on a central pin, said at least two buffer elements are two fixed magnets positioned at opposing ends of the central pin, wherein said two fixed magnets are positioned so as to hold said movable magnet in a position of equilibrium, and said at least one static field generator is a coil.

8. The system for generating the linear movement according to claim 1, wherein said at least one static field generator comprises a plurality of coils powered separately.

9. The system for generating the linear movement according to claim 1, wherein said at least one static field generator comprises a plurality of coils powered together.

10. The system for generating the linear movement according to claim 1, wherein said at least one static field generator is powered with a square-wave power profile.

11. The system for generating the linear movement according to claim 1 further comprising a diamagnetic cover which acts as a magnetic brake to decelerate movement of the electromagnetically charged body when returning to a position of equilibrium.

12. The system for generating the linear movement according to claim 1, wherein said at least one static field generator is powered with a sinusoidal power profile.

13. The system for generating the linear movement according to claim 1, wherein said at least one static field generator is powered with a sawtooth power profile.

14. The system for generating the linear movement according to claim 1, wherein selected ones of the series of controlled linear movements of the electromagnetically charged body are controlled by adjusting polarity intensity that is generated by the at least one static field generator.

15. The system for generating the linear movement according to claim 1, wherein selected ones of the series of controlled linear movements of the electromagnetically charged body are controlled by reversing polarity that is generated by the at least one static field generator.

16. The system for generating the linear movement according to claim 1, wherein selected ones of the series of controlled linear movements of the electromagnetically charged body are controlled by terminating power to the at least one static field generator.

17. The system for generating the linear movement according to claim 1, wherein during the series of controlled linear movements of the electromagnetically charged body over the temporal period, the at least one static field generator increases polarity intensity to accelerate linear movement of the electromagnetically charged body in a direction of the main direction, and the at least one static field generator decreases polarity intensity to decelerate linear movement of the electromagnetically charged body in an opposing direction of the main direction, wherein the aggregate of incremental displacements of the electromagnetically charged body over the temporal period effects an overall trajectory of the system along the main direction.

* * * * *